United States Patent
Erlingsson et al.

(10) Patent No.: US 8,136,091 B2
(45) Date of Patent: Mar. 13, 2012

(54) ARCHITECTURAL SUPPORT FOR SOFTWARE-BASED PROTECTION

(75) Inventors: Ulfar Erlingsson, San Francisco, CA (US); Martin Abadi, Palo Alto, CA (US); Mihai-Dan Budiu, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1443 days.

(21) Appl. No.: 11/700,451

(22) Filed: Jan. 31, 2007

(65) Prior Publication Data
US 2008/0184016 A1 Jul. 31, 2008

(51) Int. Cl.
- G06F 9/44 (2006.01)
- G06F 9/45 (2006.01)
- G06F 11/00 (2006.01)
- G06F 7/04 (2006.01)
- H04L 29/06 (2006.01)
- H04L 9/32 (2006.01)

(52) U.S. Cl. ........ 717/121; 717/126; 717/127; 717/141; 717/155; 713/151; 713/161; 713/166; 713/176; 713/194; 726/24; 726/25; 726/27

(58) Field of Classification Search .................. None
See application file for complete search history.

(56) References Cited

U.S. PATENT DOCUMENTS

| | | | | |
|---|---|---|---|---|
| 5,421,006 A | | 5/1995 | Jablon et al. ................ 395/575 |
| 5,428,786 A | * | 6/1995 | Sites .............................. 717/151 |
| 5,956,758 A | * | 9/1999 | Henzinger et al. ........... 711/213 |
| 6,842,862 B2 | * | 1/2005 | Chow et al. ................. 713/190 |
| 7,120,572 B1 | | 10/2006 | Liang ............................. 703/26 |
| 7,155,708 B2 | * | 12/2006 | Hammes et al. ............. 717/155 |
| 7,287,166 B1 | * | 10/2007 | Chang et al. ................. 713/187 |
| 7,577,992 B2 | * | 8/2009 | Abadi et al. .................... 726/22 |
| 7,624,449 B1 | * | 11/2009 | Perriot ............................ 726/24 |
| 7,823,135 B2 | * | 10/2010 | Horning et al. .............. 717/127 |
| 7,873,947 B1 | * | 1/2011 | Lakhotia et al. ............. 717/126 |
| 7,890,941 B1 | * | 2/2011 | Garud et al. .................. 717/158 |
| 7,971,255 B1 | * | 6/2011 | Kc et al. .......................... 726/24 |
| 2002/0066081 A1 | * | 5/2002 | Duesterwald et al. ........ 717/128 |
| 2002/0066089 A1 | * | 5/2002 | Clarke ........................... 717/155 |
| 2004/0010783 A1 | * | 1/2004 | Moritz et al. ................. 717/151 |
| 2004/0133777 A1 | | 7/2004 | Kiriansky et al. ............. 713/166 |
| 2004/0153661 A1 | | 8/2004 | Graunke ........................ 713/200 |
| 2004/0162989 A1 | | 8/2004 | Kirovski ........................ 713/189 |
| 2004/0268333 A1 | * | 12/2004 | Wang et al. ................... 717/158 |
| 2005/0022172 A1 | | 1/2005 | Howard ......................... 717/136 |
| 2005/0172277 A1 | * | 8/2005 | Chheda et al. ................ 717/151 |
| 2006/0031686 A1 | * | 2/2006 | Atallah et al. ................ 713/190 |
| 2006/0161978 A1 | | 7/2006 | Abadi et al. .................... 726/22 |
| 2006/0174077 A1 | | 8/2006 | Abadi et al. .................. 711/163 |

(Continued)

OTHER PUBLICATIONS

Tuck et al., "Hardware and Binary Modification Support for Code Pointer Protection From Buffer Overflow", 2004, pp. 1-11.*
Drinic et al., "A Hardware-Software Platform for Intrusion Prevention", 2004, pp. 1-10.*
Ren, J. et al., "Towards an Architectural Treatment of Software Security: A Connector-Centric Approach", *Software Engineering for Secure Systems-Building Trustworthy Applications*, May 15-16, 2005, 1-7, http://delivery.acm.org.

(Continued)

*Primary Examiner* — Isaac Tecklu
(74) *Attorney, Agent, or Firm* — Woodcock Washburn LLP

(57) ABSTRACT

Instruction set architecture (ISA) extension support is described for control-flow integrity (CFI) and for XFI memory protection. ISA replaces CFI guard code with single instructions. ISA support is provided for XFI in the form of bounds-check instructions. Compared to software guards, hardware support for CFI and XFI increases the efficiency and simplicity of enforcement. In addition, the semantics for CFI instructions allows more precise static control-flow graph encodings than were possible with a prior software CFI implementation.

5 Claims, 6 Drawing Sheets

U.S. PATENT DOCUMENTS

| | | | |
|---|---|---|---|
| 2006/0195906 A1 | 8/2006 | Jin et al. | 726/26 |
| 2006/0225135 A1 | 10/2006 | Cheng et al. | 726/26 |
| 2007/0143741 A1* | 6/2007 | Harris | 717/121 |
| 2009/0070885 A1* | 3/2009 | Mersh | 726/27 |
| 2010/0011209 A1* | 1/2010 | Kiriansky et al. | 713/166 |

OTHER PUBLICATIONS

Schoinas, I. et al., "Fine-Grain Access Control for Distributed Shared Memory", *ASPLOS*, 1994, 297-306, http://delivery.acm.org.

* cited by examiner

Source 150                                          Destination 160

| Opcode bytes | Instructions | | Opcode bytes | Instructions |
|---|---|---|---|---|
| FF E1 | jmp ecx ; computed jump | | 8B 44 24 04 | mov eax, [esp+4] ; dst | is instrumented as:

| Opcode bytes | Instructions | | Opcode bytes | Instructions |
|---|---|---|---|---|
| B8 77 56 34 12 | mov eax, 12345677h ; load ID-1 | | 78 56 34 12 | .data 12345678h ; ID |
| 40 | inc eax ; compute ID | | 8B 44 24 04 | mov eax, [esp+4] ; dst |
| 39 41 04 | cmp [ecx], eax ; comp ID & dst | | | |
| 75 13 | jne error_label ; if !=fail | | | |
| 8D 49 04 | lea ecx, [ecx+4] ; skip ID at dst | | | |
| FF E1 | jmp ecx ; jump to dst | | | |

| | Operation | Semantics |
|---|---|---|
| 400 | cfilabel L | if (cfi_register == L)<br>    then cfi_register := 0 |
| 410 | jmpc ra,(rb), L | cfi_register := L; jmp ra,(rb) |
| | retc ra,(rb), L | cfi_register := L; ret ra,(rb) |
| | jsrc ra,(rb), L | cfi_register := L; jsr ra,(rb) |

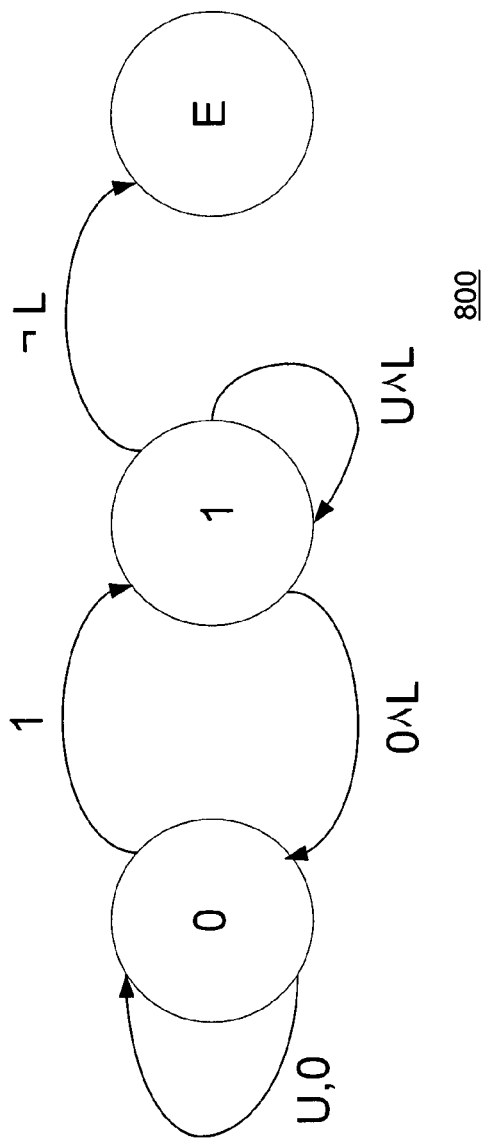
FIG. 7
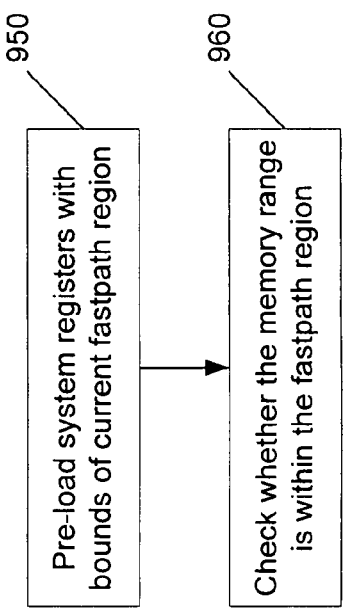
FIG. 9
Operation 900       Semantics 910
mrguardOP $r, L, H   if ($r < $lowOP + L)
                         then XFI_exception(OP)
                     if ($highOP − H < $r)
                         then XFI_exception(OP)
FIG. 8

ARCHITECTURAL SUPPORT FOR SOFTWARE-BASED PROTECTION

CROSS-REFERENCE TO RELATED APPLICATIONS

The subject matter of this application is related to that of U.S. patent application Ser. No. 11/036,121, titled "Software Security Based On Control Flow Integrity", and U.S. patent application Ser. No. 11/036,801, titled "Software Memory Access Control", both of which were filed on Jan. 14, 2005, and U.S. patent application Ser. No. 11/450,493, titled "Verifiable Integrity Guarantees For Machine Code Programs", filed on Jun. 9, 2006. Each of the above-referenced patent applications is incorporated by reference in its entirety.

BACKGROUND

Preventing software attacks is one of the most important challenges of computer security. A significant class of attacks exploits software faults to inject malicious code in the compromised system memory, using a buffer overflow, for example. Once the attack code is in memory, it may attempt to hijack the execution of the resident executable by subverting its control flow. In other cases, the attack may proceed by corrupting data that determines future activity.

Control-flow integrity (CFI) and XFI are software techniques that have been used to harden programs against powerful malicious adversaries. These protection mechanisms can be implemented in software on legacy systems, without requiring fundamental changes to hardware or operating systems.

CFI guarantees that program control flow cannot be subverted by a malicious adversary, even if the adversary has complete control of data memory. CFI may be enforced using inlined software guards that perform safety checks. XFI is a protection system that offers fine-grained memory access control and fundamental integrity guarantees for critical system state. XFI can be seen as a flexible, generalized form of software-based fault isolation (SFI).

CFI and XFI can significantly increase the security and integrity of software execution. However, there are disadvantages to software solutions, which include run-time overhead and additional complexity.

SUMMARY

Architectural support reduces the overhead and allows for less complex and cheaper enforcement. Example instruction set architecture (ISA) support replaces CFI guard code with single instructions. ISA support is provided for XFI, in the form of bounds-check instructions. Compared to software guards, hardware support for CFI and XFI increases the efficiency and simplicity of enforcement.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings:

FIG. 1 is a diagram of an example control-flow integrity (CFI) software instrumentation;

FIG. 7 is a diagram of an example three-state finite state machine (FSM) which can be used to implement the CFI ISA on a pipelined processor;

FIG. 8 is a diagram of a table of an example ISA support for XFI;

FIG. 9 is a diagram of an example XFI method; and

DETAILED DESCRIPTION OF ILLUSTRATIVE EMBODIMENTS

Figure 2:
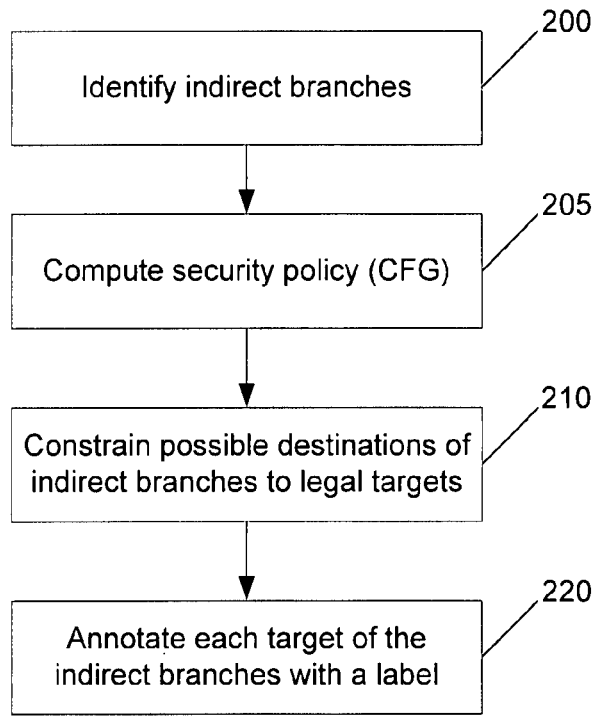
FIG. 2 is a flow diagram of an example compile-time method for CFI.

Architectural support is provided for control-flow integrity (CFI) and XFI that can reduce the overhead and allow for less complex and cheaper enforcement. An instruction set architecture (ISA) replaces CFI guard code with single instructions. ISA support is provided for XFI, in the form of bounds-check instructions. Compared to software guards, hardware support for CFI and XFI increases the efficiency and simplicity of enforcement.

Terminology pertaining to the Alpha microprocessor simulator is used herein, and the Alpha ISA is used as an example ISA. However, the hardware support is applicable to other ISAs, such as the x86 for example. The additional ISA support for CFI and XFI could be implemented in various microarchitectures which do or do not support the Alpha ISA.

Control-flow integrity means that the execution of a program dynamically follows only certain paths, in accordance with a static policy that comprises a control-flow graph (CFG) of the machine code of the program. CFI can prevent attacks which, by exploiting buffer overflows and other vulnerabilities, attempt to control program behavior. Statically (i.e., before the program is run), the complete set of legal branch targets is established (i.e., the set of legal CFG edges is fixed, including those for indirect branches such as computed jumps). The set of CFG edges is encoded within the program executable. Code is inserted to ensure that the program follows the prescribed CFG in all cases at run-time, even when the data memory of the program is arbitrarily corrupted. CFI assumes that the code segment is immutable, so direct branches need not be guarded at run-time: a static analysis can ascertain that their target lies within the code segment.

An indirect branch (also known as a computed jump, indirect jump and register-indirect jump) is a type of program control instruction present in some machine language instruction sets. Rather than specifying the address of the next instruction to execute, as in a direct branch, the argument specifies where the address is located. Thus, an example to 'jump indirect on the r1 register' would mean that the next instruction to be executed would be at the address whose value is in register r1. The address to be jumped to is not known until the instruction is executed. Indirect branches can also depend on the value of a memory location.

An indirect branch can be useful to make a conditional branch, especially a multi-way branch. For instance, based on program input, a value could be looked up in a jump table of pointers to code for handling the various cases implied by the data value. The data value could be added to the address of the table, with the result stored in a register. An indirect jump could then be made based on the value of that register, efficiently dispatching program control to the code appropriate to the input.

The software version of CFI enforcement is achieved by subjecting executables to the following two transformations: (a) inserting identifying binary "labels" at each branch destination, and (b) preceding each branch with an inline code fragment which checks that the branch destination contains the correct expected label. These code transformations can be performed either by a binary rewriter or by a compiler. In practice, CFI enforcement is applied to executables which are derived from high-level language programs. For such executables, it is straightforward statically to compute a CFG to be followed during execution.

For example, consider how an x86 indirect branch jmp ecx is instrumented using an example software version of CFI, as described with respect to the example software instrumentation shown in FIG. 1. The branch (source) 150 is shown, along with the destination 160. The example instrumentation inserts a four-byte label 12345678h 165 at the destination 160. At run-time, prior to the execution of the branch 150, a software CFI guard compares the value in memory at address ecx to these label bytes. If the value is equal to 12345678h, the branch is executed; on inequality, an error handler is invoked. Although the label used in this example is the four-byte label 12345678h, it is contemplated that any label of any given number of bytes may be used.

Features of an example software implementation of CFI guards include (1) the labels must not have byte encodings that are part of other program instructions; (2) the CFI guard code cannot contain the label bytes, unless the guard code is considered a valid destination in the CFG; (3) the guard code may overwrite other registers and flags (if these registers are live, they have to be properly saved and restored by the guard code); (4) the execution fetches data in the data cache from the code segment, causing additional memory traffic and cache pressure; and (5) the guard code contains two branches, including an additional conditional branch, which pollutes the branch predictor structures. Similar issues arise in the software implementation of XFI guards. The architectural support described herein for CFI and XFI addresses these concerns, thereby leading to less complex and more efficient enforcement.

XFI is an efficient, comprehensive software protection system that supports fine-grained memory access control and fundamental integrity guarantees for system state. XFI offers a flexible, generalized form of software-based fault isolation (SFI) by building on CFI at the machine-code level.

XFI allows several software modules to execute safely side by side within a single (even fully privileged, e.g., ring 0) address space, without use of hardware support mechanisms such as page tables, segments, or instruction virtualization. A host system can grant XFI modules access to an arbitrary number of memory regions, at byte granularity. XFI also tightly controls the entry and exit points of a module (its interfaces). XFI uses a second stack to protect control-flow information, such as return addresses. XFI provides strong integrity guarantees for the second stack, and for other critical system state, such as the flags register. XFI also makes use of a number of software guards, including CFI guards, whose use is subject to static verification.

Example guards used by XFI are memory-range guards, which bound memory accesses, checking their validity against the set of accessible regions. A bounds check precedes the execution of any memory-access instruction. For example, the guard for a four-byte write at the address pointed by eax ensures that all bytes in the range [eax, eax+4) are writable, where the brackets "[)" refer to the half-open interval. Memory-range guards form the bulk of the XFI guards. The frequent use of memory-range guards introduces significant execution overheads. Architectural support is provided herein for memory-range guards.

XFI may take advantage of control-flow integrity to relocate a memory-range guard to a program point that dominates the actual instruction subject to a bounds check. CFI allows XFI to hoist guards even out of loops: because control flow cannot be subverted, the guards are always executed. As a consequence of hoisting guards, XFI can merge several checks of memory accesses made through the same pointer into a single bounds check. For example, instead of performing two separate write checks for eax−1 and eax+2, XFI can merge them in a single write check for the interval [eax−1, eax+2], preceding both writes. The assumption is that all intermediate bytes are also writable. Therefore, XFI memory-range guards check that a memory range is accessible around an address held in a register, within constant offsets L, below, and H, above. For example, as shown in FIG. 8, described further below, an XFI memory-range guard instruction 900 checks the address held in register $r with constant offsets L and H.

In general, a module may have access to a large number of disjoint, contiguous memory regions. One of these regions [A,B) may be more frequently accessed during execution and its bounds are of particular interest. These could be, for example, the bounds of the heap of the current module. An XFI memory-range guard should be fast when it succeeds within the range [A,B), and should fallback on a slower solution for checking other ranges. The range [A,B) is called the "fastpath" range.

It has been shown that XFI memory-range guards can be implemented using a fastpath software check. However, even this fastpath software implementation requires several instructions and branches, and has significant overheads for memory-access-intensive benchmarks.

An ISA extension is described that offers hardware support for CFI. The semantics for CFI instructions allows more precise static control-flow graph encodings than were possible with a prior software CFI implementation. An ISA extension is also described for XFI.

FIG. 2 is a flow diagram of an example compile-time method for CFI. At compile-time, indirect branches are identified, at step 200, e.g., based on their opcode in most architectures. Assuming that the programs are not self-modified, it is known what the executed instructions are. At step 205, the security policy that comprises the program CFG is determined. The possible destinations of indirect branches (including procedure returns) are constrained to a set of legal targets within the program CFG, at step 210. Each target of an indirect branch is statically annotated with a label embedded within the binary code, at step 220.

Figure 3:
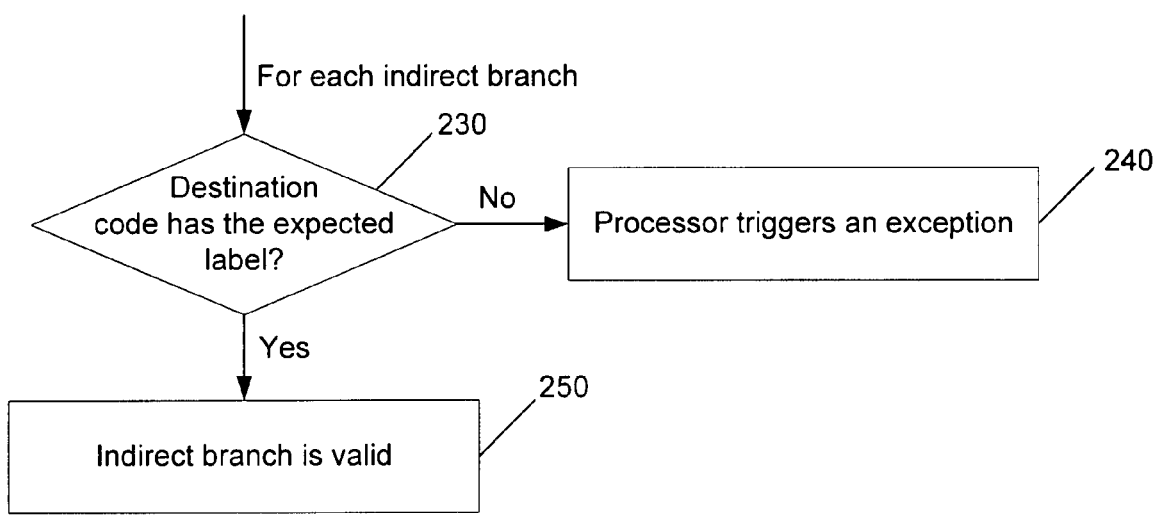
FIG. 3 is a flow diagram of an example run-time method for CFI.

The processor processes each indirect branch and its destination separately, perhaps far apart in time (e.g., if the destination label of the branch is on a page which faults). A branch is processed, and then at some point, shown with respect to an example in FIG. 3, at step 230, a check is performed to establish whether the destination code contains the expected label. If the correct label is not present, the processor triggers an exception, at step 240. If the correct label is present, then the indirect branch is valid, at step 250. In this way, indirect branches cannot target anywhere but the places that contain the correct embedded labels. As used herein, triggering an exception may involve invoking an architecture-defined mechanism for hardware faults, or traps. Alternatively, triggering an exception may involve another exception path, such as the invocation of a remedial handler (pointed to by a special register or other software-managed hardware state), with the effective semantics of a call that saves a return address on the stack in a standard fashion, for example.

For CFI, a stream of instructions is received, and the stream will ideally contain pairs of matching instructions (e.g., "jmpc ra, (rb); L1", "cfilabel L1"). But the stream may contain an incorrect sequence, such as "jmpc ra, (rb), L", "inc eax", or "jmpc ra, (rb), L1", "jmpc ra, (rb), L2", for example. Or perhaps the stream may contain a correct (matching) but long sequence, such as "jmpc ra, (rb), L1", "cfilabel L2", "cfilabel L3", "cfilabel LA", "cfilabel L1", "inc eax". Such a long sequence should not trigger an exception—desirably, there can be any number of cfilabel instructions between the jmpc L1 and the matching cfilabel L1.

It is imperative to implement the CPU so that it remembers information after seeing the instructions so that it correctly accepts the correct sequences and it rejects the incorrect sequences. According to an embodiment, information about the last label is seen in a jump. This information is put in a register, called cfi_register, for example. According to CFI, if the instruction is a jmpc, the CPU sets the cfi_register to start checking for a match. If the instruction is a cfilabel, the CPU checks whether the cfi_register matches, and if so, to clears the register, since this means that the stream of labels has ended correctly. If the instruction is not a label and the cfi_register is not 0, the CPU starts checking for a match, and triggers an exception. This means a jump has been seen in the past, and thus a label should be reached before any other instruction is executed.

According to an embodiment, the CPU notes every time it sees a jmpc (label), and erases it every time it sees a matching cfilabel (label). Desirably, it triggers an exception when it sees a non-cfilabel (label) and it has previously recorded a jmpc (label).

cfi_register can be saved and restored by the operating system on traps, interrupts, kernel entry and exits, and context switches, allowing the CFG to be virtualized per process.

Figures 4, 5:
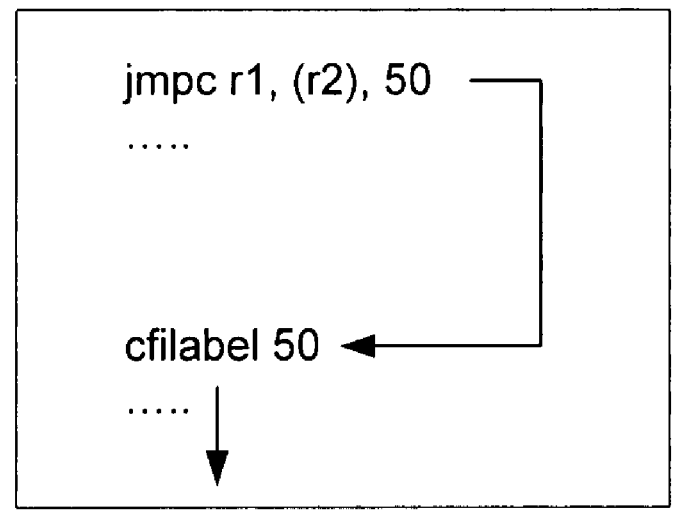
FIG. 4 is a diagram of a table of example instruction set architecture (ISA) support for CFI.
FIG. 5 is a diagram of an example use of CFI instructions.

Example Alpha ISA support is extended with four instructions, as shown in FIG. 4. FIG. 5 describes the flow of control when a checked indirect jump is taken. As shown, there is a cfilabel instruction 400, and three "checked jump" instructions 410. Other ISAs, such as x86, could support instructions with similar functionality, but tailored to specific constraints of the ISA (e.g., instruction length, opcode structure, number of registers, etc.).

The cfilabel instruction 400 is used to embed a label bit pattern within the code segment at the destination of a branch. Each checked jump instruction 410 also embeds a label bit pattern, and has the effect of a CFI guard, and thus eliminates multiple instructions in the software implementation.

More particularly, to implement these instructions, a new integer register, cfi_register, is added to the microarchitecture. Further to that described above, the cfi_register is a small piece of memory that acts as a scratchpad for the CPU to use to remember whether it has seen a checked jump since the last cfilabel. This register can be used only implicitly by the new instructions, as described below. On an out-of-order architecture with register renaming, the cfi_register is renamed like other integer registers, allowing multiple CFI instructions to be in-flight at the same time.

The cfilabel instruction is the destination of the checked branch instructions. cfilabel contains an immediate label value; for the Alpha ISA it is a 16-bit immediate. For other ISAs, such as x86, more bits could be used. The effect of the instruction is to compare the immediate with the contents of the cfi_register, and to reset the cfi_register if its immediate label is equal to the contents of the cfi_register.

Retiring any instruction except a cfilabel when cfi_register has non-zero contents causes the processor to trigger an exception.

Figure 6:
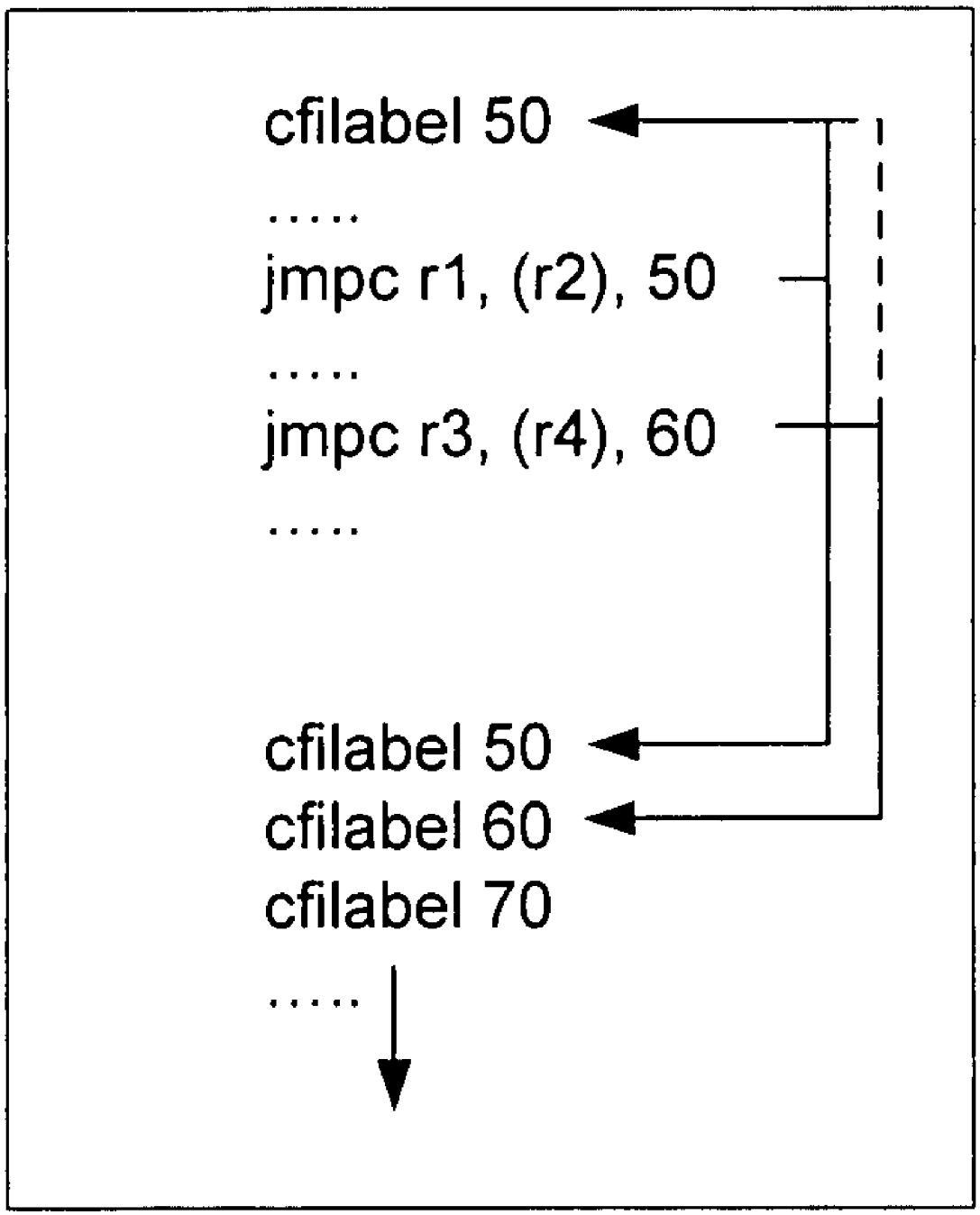
FIG. 6 is a diagram of an example implementation of join points in a control-flow graph (CFG)

This choice of a semantics for the cfilabel allows multiple cfilabel instructions with different immediates to be used in sequence to implement join points in the CFG, as shown in FIG. 6. Such a join point can be the target of multiple branches with different labels. The join points allow embedding precise static CFGs within the program.

More concretely, the software inlined guards require that the program labels are partitioned into equivalence classes. The partitioning may force branches with different but overlapping sets of destinations to have identical labels, resulting in a coarser approximation of the CFG. The ISA implementation removes this restriction. FIG. 6 shows implementing join points in the CFG. The dashed line is an extra CFG edge which is introduced in the prior software version of CFI by the constraint on CFG equivalence classes. The hardware version of CFI does not require this CFG edge to be present.

Thus, the example in FIG. 6 shows two branches, with labels 50 and 60, that can target a common basic block in the CFG. With conventional CFI software guards, the dotted edge from FIG. 6 would have to be present in the CFG (because labels 50 and 60 are in the same equivalence class).

The three checked branch instructions introduced herein correspond closely to the traditional ISA instructions JMP (indirect branch), RET (return from subroutine), and JSR (jump to subroutine), respectively. For the Alpha ISA, the instructions use the low 16 bits of the opcode to encode the CFI label. For other ISAs, the instructions could use more immediate bits to encode the label. As shown in FIG. 4, the first step of the execution of a checked branch sets cfi_register to the value of the immediate label. Next, the execution continues like the corresponding unchecked branch.

Note that in a pipelined processor, the commit stage check can be implemented without accessing the register file (there is no need to add extra ports or bypass paths), by monitoring dynamically the operations which change the value of cfi_register (e.g., the operations in FIG. 4). Each instruction is desirably tagged in the execution stage with the value of the predicate (cfi_register≠0) after its execution. In an example implementation, the value is one of {0, 1, U}, where U is defined as "unchanged".

A pipeline processor can use the three-state finite state machine (FSM) 800, shown in FIG. 7, to implement the commit stage. This FSM processes the stream of the in-order committed instructions, and uses the tag of each instruction to trigger the CFI exceptions. FSM is used by the commit stage to retire instructions. The state label indicates the current value of the predicate cfi_register≠0. When the FSM enters the state labeled E, a CFI exception is triggered. The arc events are labeled from instruction that retire: 0 if the instruction has set cfi_register to 0 in the EX stage, 1 if the instruction has set cfi_register to a non-zero value, and U if the instruction has left the register unchanged. An L on an arc indicates that a cfilabel instruction is retiring.

Regarding hardware support for XFI, XFI offers comprehensive software-based protection that includes a generalized form of software-based fault isolation. XFI allows several software modules to execute in the same privileged address space, through the enforcement of memory access constraints and restrictions on both hardware and software interfaces. In particular, XFI requires all computed memory accesses to be checked at run-time by a memory-range guard.

ISA support for XFI memory-range guards is desirably added to the hardware architecture, because these guards cause the bulk of XFI run-time overhead, and contribute to the complexity of XFI enforcement. Example ISA support comprises three ISA instructions, as shown in FIG. 8, and aspects of which are described with respect to FIG. 9, for example.

OP is one of R (read), W (write), or X (execute). $lowOP and $highOP in semantics 910 are new registers that are pre-loaded, at step 950, with the bounds of the current fast-path region [A_OP, B_OP). The mrguardOP operation 900 checks whether [$r−L, $r+H) is contained within [A_OP, B_OP), during run-time at step 960. It is contemplated that the bounds system registers may also be loaded at run-time.

With XFI, a bounds access instruction is desirably put before any memory access instruction. For example, regarding the XFI instruction "mrguard $r, H, L", if register $r is not within bounds B−H, A+L, an exception is triggered. A and B are the values of two bounds registers, which are added to the processor, and H and L are constant values in the instruction, such as 5 and 7, for example. More particularly, in the Alpha ISA each mrguard (memory-range guard) instruction encodes explicitly two 10-bit immediate values, L and H, although it is contemplated that value of any bit size may be used. An instruction set like x86 could devote more bits to the encoding of these bounds. The instruction implicitly refers to two of six fixed registers, $lowOP and $highOP (a pair for each OP in {R,W,X}). These registers, respectively, hold the address bounds for the fastpath range [A_OP, B_OP). Note that by using registers, the mrguard instructions are more flexible than the software guards, which encode [A_OP, B_OP) using immediate constants.

The example mrguard instruction performs hardware checks against only a single memory range [A_OP, B_OP). To permit other memory ranges, the XFI software handler may be invoked. In an alternative implementation, a hardware check could be performed against multiple memory ranges by using a parallel search of a small, associative lookaside structure, for example. With this technique, lookup failure would still invoke a software handler, but might happen less frequently. Software management of the associative structure could make it reflect the most common memory ranges. Such extended mrguard hardware support can be both straightforward and inexpensive, e.g., with an implementation similar to that of protection-lookaside buffers. The register-based mrguard instructions described herein can be seen as a special case that uses a single-entry lookaside structure.

The mrguard instructions are suitable for bounding memory accesses with constant known compile-time offsets L and H from the base register.

In a software implementation, the job of the jmpc or mrguard instructions is handled by four to six machine code instructions, including a conditional branch for dispatching to the error label. The ISA support alternative described herein has a smaller executable size; reduced pressure on instruction-fetch related structures (I-cache, trace-cache, branch predictor); decreased register pressure, since no intermediate results need to be computed; no pollution of the condition flag registers (for architectures with implicit side-effects, such as x86); and no pollution of the data-cache for fetching of the label from the code segment for CFI. Thus, ISA support can reduce the complexity and enhance the efficiency of inlined enforcement of security policies.

Architecture support for software-based protection can substantially increase the efficiency and simplicity of the CFI and XFI implementations.

Example Computing Environment

Figure 10:
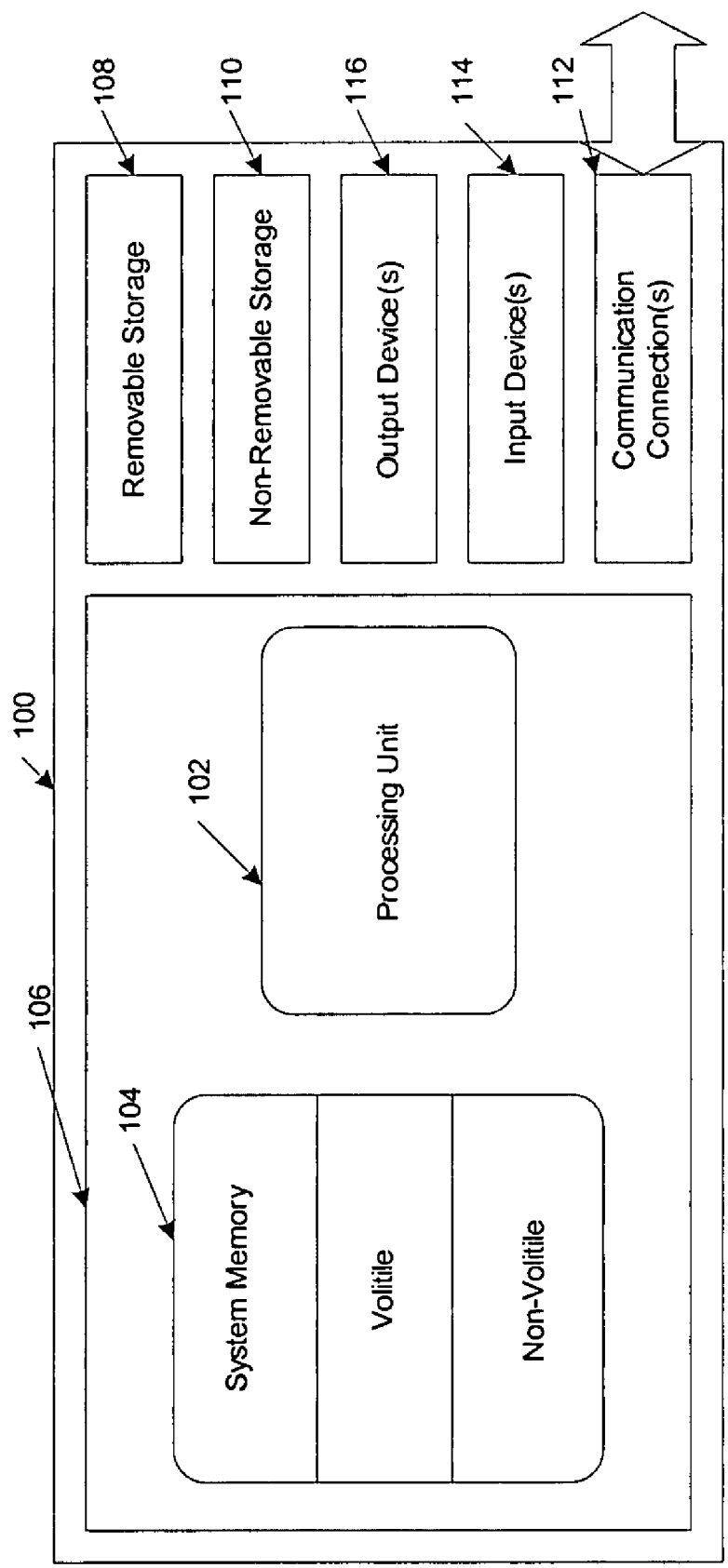
FIG. 10 is a diagram of an example computing environment in which embodiments may be implemented.

With reference to FIG. 10, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 10 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 10 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

The processing unit 102 (e.g., a central processing unit (CPU), or sometimes simply processor), is the component in a digital computer that interprets computer program instructions and processes data. The program is represented by a series of numbers that are kept in some kind of computer memory. There are four steps that many CPUs use in their operation are fetch, decode, execute, and writeback.

The first step, fetch, involves retrieving an instruction (which is represented by a number or sequence of numbers)

from program memory. The location in program memory is determined by a program counter (PC), which stores a number that identifies the current position in the program. In other words, the program counter keeps track of the CPU's place in the current program. After an instruction is fetched, the PC is incremented by the length of the instruction word in terms of memory units. Often the instruction to be fetched must be retrieved from relatively slow memory, causing the CPU to stall while waiting for the instruction to be returned. This issue is largely addressed in modern processors by caches and pipeline architectures.

The instruction that the CPU fetches from memory is used to determine what the CPU is to do. In the decode step, the instruction is broken up into parts that have significance to other portions of the CPU. The way in which the numerical instruction value is interpreted is defined by the CPU's ISA. Often, one group of numbers in the instruction, called the opcode, indicates which operation to perform. The remaining parts of the number usually provide information required for that instruction, such as operands for an addition operation. Such operands may be given as a constant value (called an immediate value), or as a place to locate a value: a register or a memory address, as determined by some addressing mode. In older designs, the portions of the CPU responsible for instruction decoding were unchangeable hardware devices. However, in more abstract and complicated CPUs and ISAs, a microprogram is often used to assist in translating instructions into various configuration signals for the CPU. This microprogram is sometimes rewritable so that it can be modified to change the way the CPU decodes instructions even after it has been manufactured.

After the fetch and decode steps, the execute step is performed. During this step, various portions of the CPU are connected so they can perform the desired operation. If, for instance, an addition operation was requested, an arithmetic logic unit (ALU) will be connected to a set of inputs and a set of outputs. The inputs provide the numbers to be added, and the outputs will contain the final sum. The ALU contains the circuitry to perform simple arithmetic and logical operations on the inputs (like addition and bitwise operations). If the addition operation produces a result too large for the CPU to handle, an arithmetic overflow flag in a flags register may also be set.

The final step, writeback, simply "writes back" the results of the execute step to some form of memory. Very often the results are written to some internal CPU register for quick access by subsequent instructions. In other cases, results may be written to slower, but cheaper and larger, main memory. Some types of instructions manipulate the program counter rather than directly produce result data. These are generally called "jumps" and facilitate behavior like loops, conditional program execution (through the use of a conditional jump), and functions in programs. Many instructions will also change the state of digits in a "flags" register. These flags can be used to influence how a program behaves, since they often indicate the outcome of various operations. For example, one type of "compare" instruction considers two values and sets a number in the flags register according to which one is greater. This flag could then be used by a later jump instruction to determine program flow.

After the execution of the instruction and writeback of the resulting data, the entire process repeats, with the next instruction cycle normally fetching the next-in-sequence instruction because of the incremented value in the program counter. If the completed instruction was a jump, the program counter will be modified to contain the address of the instruction that was jumped to, and program execution continues normally. In more complex CPUs, multiple instructions can be fetched, decoded, and executed simultaneously.

The simplest processors are scalar processors. Each instruction executed by a scalar processor typically manipulates one or two data items at a time. By contrast, each instruction executed by a vector processor operates simultaneously on many data items. An analogy is the difference between scalar and vector arithmetic. A superscalar processor is sort of a mixture of the two. Each instruction processes one data item, but there are multiple redundant functional units within each CPU so that multiple instructions can be processing separate data items concurrently.

A superscalar CPU architecture implements a form of parallelism called instruction-level parallelism within a single processor. It thereby allows faster CPU throughput than would otherwise be possible at the same clock rate. A superscalar architecture executes more than one instruction during a single pipeline stage by pre-fetching multiple instructions and simultaneously dispatching them to redundant functional units on the processor. The superscalar approach is but one performance enhancing method based on exploiting instruction-level parallelism.

The CFI and XFI ISA support are applicable to scalar, vector, pipelined, and superscalar processor architectures.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed is:

1. A method of enforcing control-flow integrity (CFI) of a software program operating in conjunction with a microprocessor and associated with a control flow graph (CFG), comprising:
    identifying indirect branches in the software program, and destinations of the indirect branches;
    constraining the destinations to a set of targets within the CFG;
    annotating each target of each indirect branch with a label; and
    for each indirect branch, using a microarchitecture that comprises a CFI integer register that stores information about a checked jump instruction to determine if the destination contains the label, to determine that the indirect branch is valid if the label is present, and to otherwise trigger an exception;

extending an instruction set architecture (ISA) with at least one instruction to embed a label within the software program code at the destination of a branch,
wherein the at least one instruction in the ISA is used to embed an immediate label value in the program code,
comparing the immediate label value with the contents of the CFI integer register, and resetting the CFI register if the immediate label value equals the contents of the CFI integer register.

2. The method of claim of claim 1, wherein the at least one instruction comprises the checked jump instruction.

3. The method of claim 2, wherein the checked jump instruction is a CFI guard.

4. The method of claim 1, further comprising triggering an exception if the label is not present and the adding a CFI integer register stores non-zero contents.

5. The method of claim 1, further comprising determining the CFG.

* * * * *